O. W. DODGE.
BELT FASTENER.
APPLICATION FILED SEPT. 27, 1911.
1,081,024. Patented Dec. 9, 1913.
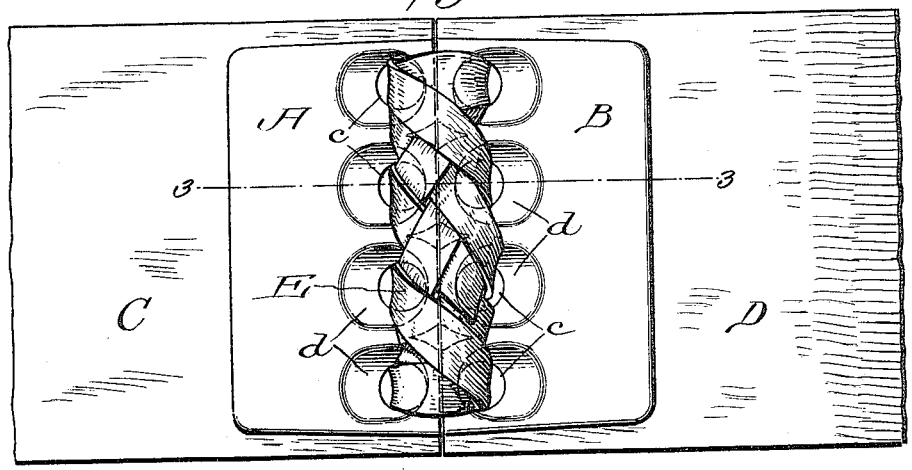
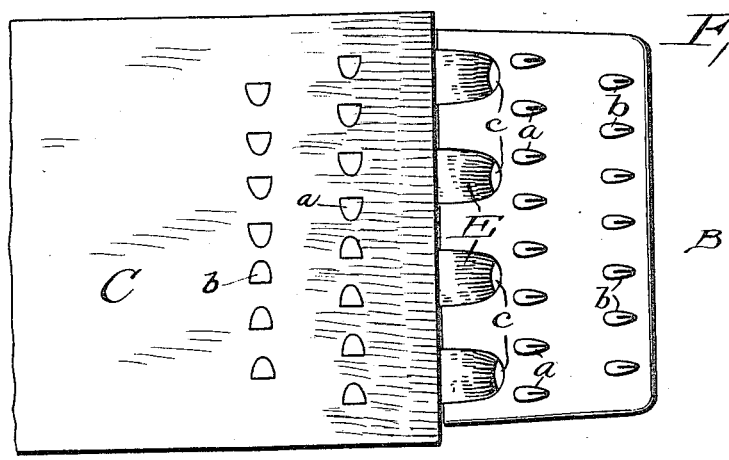
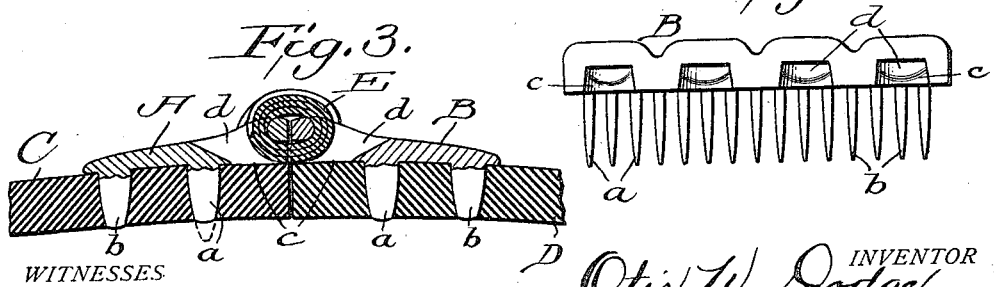

UNITED STATES PATENT OFFICE.

OTIS WM. DODGE, OF SPOKANE, WASHINGTON.

BELT-FASTENER.

1,081,024.  Specification of Letters Patent.  Patented Dec. 9, 1913.

Application filed September 27, 1911. Serial No. 651,586.

*To all whom it may concern:*

Be it known that I, OTIS W. DODGE, of Spokane, in the county of Spokane and State of Washington, have invented certain new and useful Improvements in Belt-Fasteners; and I hereby declare that the following is a full, clear, and exact description thereof, reference being had to the accompanying drawings, which form part of this specification.

This invention is a novel belt fastener and its object is to connect the ends of a belt with a flexible hinge joint that will give at the taut places, and provide for distributing the strain on the belt which will give an equal stress on the entire length of the belt joint.

Belt fasteners have heretofore been provided with hinge joints, but such fasteners as heretofore made have the disadvantage that the joint is rigid and not flexible and this renders them of little or no value, for where a joint does not equalize the strain on the belt some parts of the belt are subjected to more strain than other parts, and therefore the belt must of necessity run in a distorted condition, and in consequence will not run as well nor as long as it would if the strain was equal at every part of the belt joint.

In the accompanying drawings I have illustrated a belt fastener embodying the invention and will describe the same in detail with reference thereto, and refer to the claims for summaries of the essential features and combinations of parts of the fastener for which protection is desired.

In the drawings Figure 1 is a plan view of the meeting ends of a belt united by my fastener, the latter being shown in outer or top plan view. Fig. 2 is a view of the under side of the belt at the joint, one end of the belt being removed to show the inner or under side of one of the fastener members in plan. Fig. 3 is an enlarged longitudinal section on line 3—3, Fig. 1. Fig. 4 is an edge view of one member of the fastener showing the abutting edge.

The fastener is composed of two opposite similar members A and B; each member is preferably formed of malleable metal of any suitable kind; I prefer malleable cast iron for the purpose of strength and cheapness. I preferably make two companion or similar members of an equal length, but, I preferably vary the length of these companion members as desired, so as to suit the different widths of belts they are to be used to fasten. Each member is provided with preferably integral tangs or prongs, which are preferably arranged in two rows $a$, $b$; and the tangs in row $b$ preferably stand intermediate the tangs in row $a$. These tangs are adapted to be driven through the belt and then clenched thereupon, as indicated in Fig. 2.

The inner, or meeting, edges of the fastening members are preferably thickened, and abut against each other when attached to the belt, and each is provided with a series of preferably tangentially disposed openings or lacing eyelets $c$, which extend in a row longitudinally of the member and transversely of the belt, and are preferably tapered and rounded or flared at their outer ends as shown, so as to offer no cutting edges to the lacings. On the under, or inner, side of each member adjacent the abutting edge and each eyelet $c$ is a transversely disposed groove $d$ which opens into the eyelet and through the abutting edge of the member, and enables the lacing to be inserted through the eyelets and passed from the eyelets in one member into the eyelets of the other across the abutting edges of the members without projecting under the members as shown in Fig. 4, and for the purpose above described. The opposite members of the fastener are attached to the opposite ends C, D, of the belt as shown in the drawings, by the tangs $a$, $b$, which are riveted thereto; the ends of the belt being cut off flush with the meeting edges of the members of the fastener. A lacing E, preferably of raw-hide, but any other suitable material may be used, is then passed successively through the alined eyelets of the adjacent halves as indicated in the drawings, and securely but flexibly unite the members as above described. In this manner the belt is fastened by a substantial joint; and if the fastener members are not secured to the belt perfectly square with the ends thereof; or if the belt itself is not cut perfectly square at ends to be joined together, the flexibility of my fastener is such that when the working tension of the belt is applied my fastener equalizes the tension throughout the entire joint of the belt, and therefore every part of the belt carries an equal tension and this insures straight smooth running of the belt.

The flexibility of the joint formed by my fastener is such that if the belt were carelessly put together by inexperienced workmen the strain or tension would immediately equalize when the belt was started to running. This flexibility prevents the fastener members from being bent or broken from unequal strain, and also prevents tearing of the fabric of the belt, either of which destroys the efficiency of the belt to transmit power, and would ultimately render the belt useless.

Preferably I desire to make the fasteners of various sizes and weights, to suit whatever width and thickness of belt I desire to fasten.

What I claim is:

1. A belt fastener comprising opposite members adapted to be attached to the meeting ends of a belt, and having straight vertical abutting meeting edges adapted to lie close together throughout their length and extend from the belt outwardly when the members are attached to the ends of the belt, each member being provided with vertical eyelets adjacent its meeting edge, and with longitudinal grooves on its under side extending from the eyelets to and through the abutting edge of the member; and a lacing engaging the eyelets and grooves of the opposed members and connecting them without distorting the belt.

2. A belt fastener comprising opposite similar members each provided with integral tangs or prongs in its under side whereby it may be attached to one end of the belt, and each having a straight vertical abutting meeting edge resting flat against the belt, and provided with vertically opening eyelets adjacent its meeting edge, and with grooves on its under side communicating with the eyelets and extending therefrom through the meeting edge, the grooves being parallel with the length of the belt, and means engaging said eyelets and grooves to hingedly connect the members while permitting their meeting edges to rest directly against the belt.

In testimony that I claim the foregoing as my own, I affix my signature in presence of two witnesses.

OTIS WM. DODGE.

Witnesses:
ALONZO M. MURPHY,
M. D. EVERS.

---

Copies of this patent may be obtained for five cents each, by addressing the "Commissioner of Patents, Washington, D. C."